June 20, 1967  D. B. RISHER  3,326,046
MULTI-TRANSDUCER PRESSURE MEASURING DEVICE
Filed Aug. 28, 1964  4 Sheets-Sheet 1

INVENTOR.
Donald B. Risher

BY

ATTORNEY.

June 20, 1967 D. B. RISHER 3,326,046
MULTI-TRANSDUCER PRESSURE MEASURING DEVICE
Filed Aug. 28, 1964 4 Sheets-Sheet 3

INVENTOR.
Donald B. Risher

BY

ATTORNEY.

United States Patent Office 3,326,046
Patented June 20, 1967

3,326,046
MULTI-TRANSDUCER PRESSURE MEASURING
DEVICE
Donald B. Risher, Bowie, Md., assignor to the United
States of America as represented by the Secretary of
the Navy
Filed Aug. 28, 1964, Ser. No. 392,967
7 Claims. (Cl. 73—389)

The invention described herein may be manufactured and used by or for the Government of the United States of America for governmental purposes without the payment of any royalties thereon or therefor.

This invention relates to a system for calibrating and measuring pressures within supersonic and hypersonic wind tunnels, and more particularly to high speed calibration and pressure measurement at a large number of stations within a wind tunnel.

Systems for the accurate measurement of a large number of pressures in a short period of time have received considerable attention in the past. Such systems have a particular interest with respect to supersonic and hypersonic wind tunnel applications. The evolution of such pressure measuring systems extends from a single tube mercury manometer, the multiple tube manometer, oil filled manometers, dial gauges, pressure switches, to the many types of pressure transducers. In the design of a system for use in conjunction with high speed data reproduction apparatus, the technical areas which may be chosen to be optomized include high speed data taking capability, rapid pressure stabilization, and fast gauge calibration. High speed data reduction systems require pressure measuring instruments which provide an electrical output. Transducers are available which satisfy this requirement but careful consideration must be given to proper sensitivity, selection, repeatability, and linearity. Since pressure switching cannot be tolerated in high speed systems, each pressure to be measured should be measured with one transducer. In order to provide for the rapid calibration of a large plurality of gauges, a valving system is required that will isolate tunnel pressures during calibration and provide all transducers having the same pressure range with common reference pressures. After the calibration has been performed, the valving system must provide a direct path between each pressure line and its corresponding transducer and isolate the calibration pressure from the transducers. The valving system and drive mechanisms for positioning the valves must be located inside the tunnel and be controlled from a point outside the tunnel.

This invention provides a novel valve and pressure transducer assembly which makes possible the calibration of a large number of pressure transducers which may be connected to a large number of different pressure stations. In this invention a pressure transducer and valve assembly, two sets of eight radially disposed and aligned pressure transducers are mounted in a cylindrical block and controlled by a pair of rotary valves. By connecting three of these cylindrical units together, a system for calibrating the pressure transducers and measuring pressures at forty-eight separate locations may be accomplished. Each of the several units may be placed within the wind tunnel such that a minimum amount of tubing is required between the actual points of pressure measured and the corresponding pressure transducer. By utilizing two of these assembly units, pressures may be independently measured from as many as ninety-six positions within the tunnel. These assembly units may be water cooled if desired to keep the temperature of the pressure transducers at a desired level.

It is an object of this invention to provide a pressure transducer and valve assembly in which a relatively large number of pressure transducers may be switched from test pressures to wind tunnel pressures in a very short period of time.

It is another objective of this invention to provide a rotary valve assembly for switching a plurality of pressure transducers from calibration pressures to actual wind tunnel test pressures simultaneously.

It is still another object of this invention to provide a large array of pressure transducers for wind tunnel measurements in which switching from calibration to test pressures may be made in a short period of time.

It is a further object of this invention to provide a large array of pressure transducers for measuring wind tunnel pressures for use with high speed data reduction systems.

It is still a further object of this invention to provide a means to simultaneously calibrate a large number of pressure transducers within a wind tunnel and record this calibration in a data storage system.

It is yet another object of this invention to provide a large array of pressure transducers for simultaneously measuring a large number of independent pressures within a wind tunnel.

Other objects and many of the attendant advantages of this invention will be readily appreciated as the same become better understood by reference to the detailed description when considered in connection with the accompanying drawings in which like reference numerals designate like parts throughout the figures thereof and wherein:

FIG. 1 of the drawings illustrates a cylinder, partly in section, which includes a transducer and valve assembly of an embodiment of the instant invention in which the valve is in the tunnel read position;

FIG. 2 illustrates a partial section of the transducer and valve assembly in which the valve is in the calibrate position;

FIG. 3 of the drawings illustrates a view of the inside of the valve body of this invention;

Figure 1:
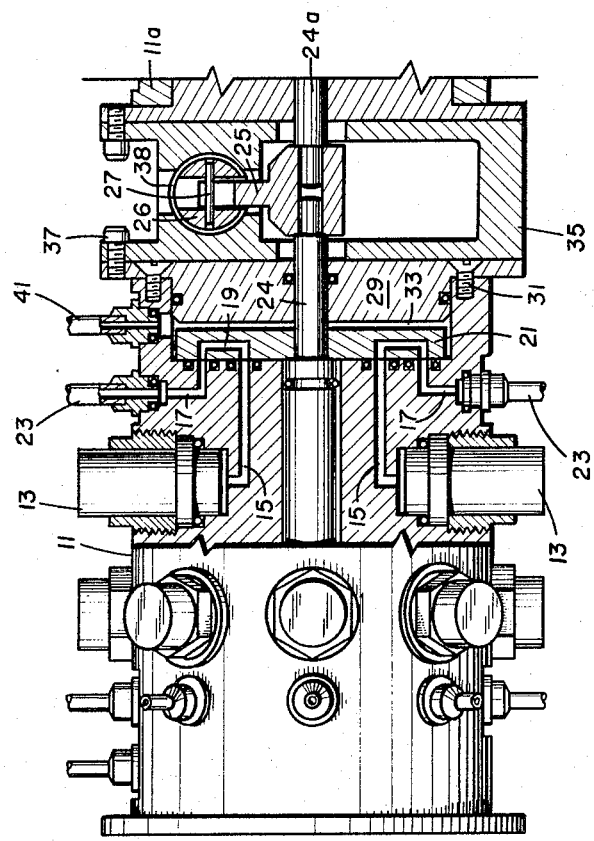

Referring now to FIG. 1 of the drawings in which pressure transducer and rotary valve assembly is illustrated cylindrical body 11, shown partly in section, has two rows of radially disposed and aligned pressure transducer units 13. In the first or tunnel read position in which pressures from the tunnel are applied to the transducers, passageways 15 are connected to passageways 17 through passageways 19 of the rotating valve body 21. Pipes or tubing 23 connect to test pressure stations within the wind tunnel such that pressures may be applied directly to the transducers 13 through passageways 15, 17, and 19 when the valve 21 is in the tunnel read position. The selector or valve 21 is mounted on a shaft 24. Shaft 24 is connected to a connecting rod member 25 which is connected to piston 26 through pin 27. End plate 29 is attached to cylinder 11 by bolt members 31. A vacuum chamber 33 is formed by a space between rotary valve body 21 and end plate 29. A piston housing 35 is connected to end plate 29 by bolt members 37. It is noted that a second cylinder body 11a may also be bolted to the piston housing 35. Piston 26 is slideable within cylinder wall 38. It is also noted that a shaft 24a may be fastened to the piston connecting rod 25.

Figure 2:
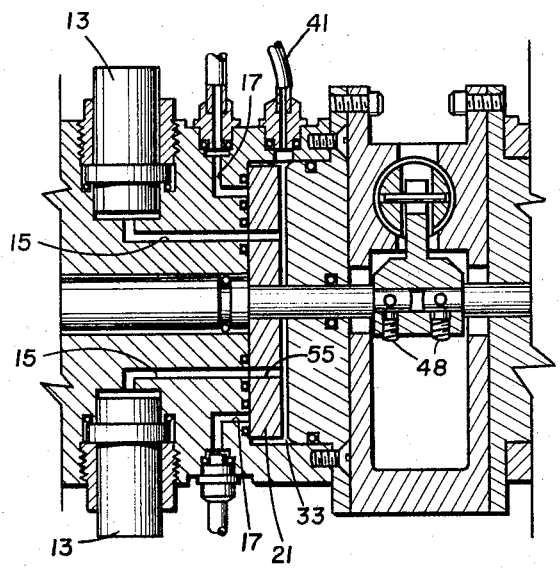

Referring now to FIG. 2 of the drawings, it may be seen that the selector disc or valve body has been rotated to the test or calibrate position. In this position, passageways 17 are disconnected from passageways 15 and passageways 15 are in communication with the vacuum chamber 33. Vacuum chamber 33 connects to the vacuum reference tube 41. With the valve 21 in this position all eight of the transducers 13 are in pneumatic communication with vacuum reference chamber 33. In this position either a total vacuum or a reference pressure may be applied to transducers 13 in order that the transducers may be calibrated. Transducers 13 will provide an electrical output voltage which is proportioned to the pressure applied. Normally the transducers will have a linear pressure and voltage characteristic and therefore it is necessary only to calibrate them at two points, preferably a vacuum and a known reference pressure. In this manner the electrical characteristic of the transducer may be determined and stored in a data reduction system.

Figure 3:
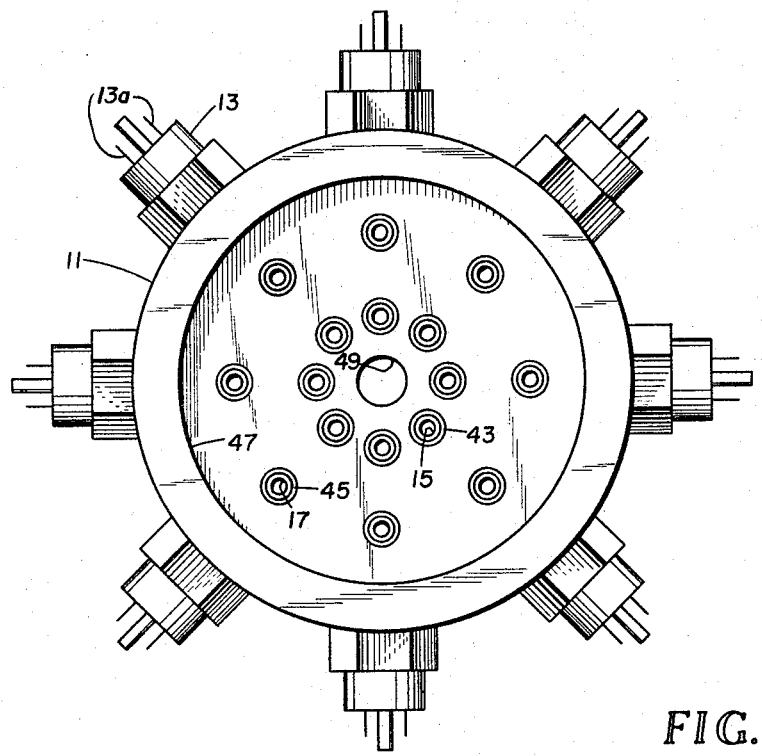

Referring now to FIG. 3 of the drawings, a section through cylinder 11 is shown in which the rotary valve or selector disc 21 is house. The inner passageways 15 are provided with O-rings 43 and the outer passageways 17 are provided with O-rings 45. Cylindrical body 11 is provided with central hole 49 to accept shaft 24. Transducers 13 are provided with electrical output circuit terminals 13a.

Figure 4:
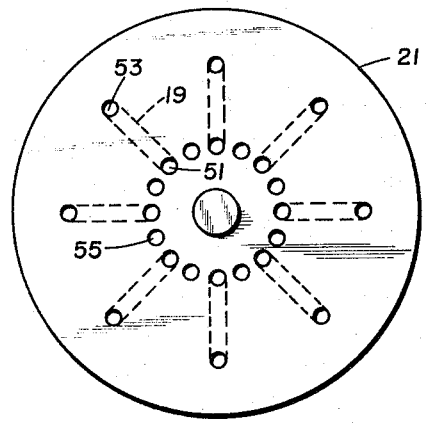
FIG. 4 illustrates the valve body of the instant invention.

Referring now to FIG. 4 of the drawings, the rotary valve body 21 may be seen with the holes or passageways which provide connections between the vacuum chamber and the pressure transducers. It is noted that the inner holes 51 and the outer holes 53 are connected to the passageways 19. It is further noted that inner holes 55 are drilled completely through the entire width of the valve body to form passageways which are shown in FIG. 2 of the drawings. The outer circumference of valve body 21 fits movably within cylindrical surface 47 of cylindrical body 11.

Figure 5:
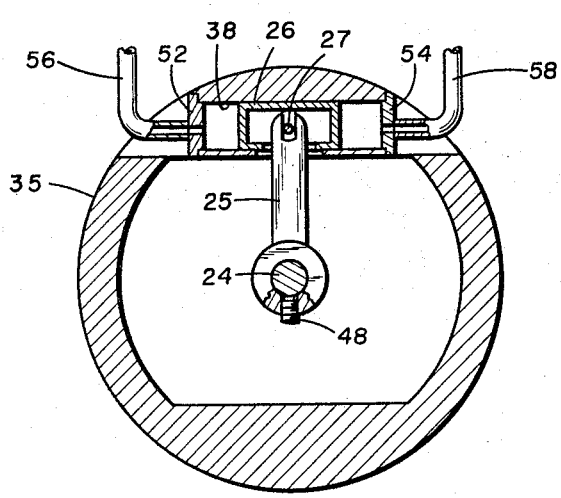
FIG. 5 illustrates a view partly in section of the piston actuation means of the valve body of the instant invention.

Referring now to FIG. 5 of the drawings in which a sectional view of the pneumatic actuating device is illustrated, a piston actuating housing 35 is shown containing a piston 26 which is designed for slideable engagement with cylinder wall 38 of housing 35. A connecting arm or rod 25 is provided for converting the translational motion of piston 26 into the rotary motion required for the rotary valve 21, not shown. Connecting arm or rod 25 may be connected to piston 26 by bearing or pin 27 and the other end of the connecting rod 25 may be fixedly attached to rotary shaft 24 by means of threaded bolts 48. Cover plates 52 and 54 may be used to seal the ends of cylinder wall 37 and provide a means for connecting pressure tubes 56 and 58 to the piston 26.

In operation, the rotary valve may be rotated to the right by the application of a fluid pressure through tube 56, and similarly the rotary valve may be rotated to the left by applying a fluid pressure through tube 58. Stops may be provided to assure alignment of the passageways in the cylindrical block with the passageways in the valve for each position of the valve.

Figure 6:
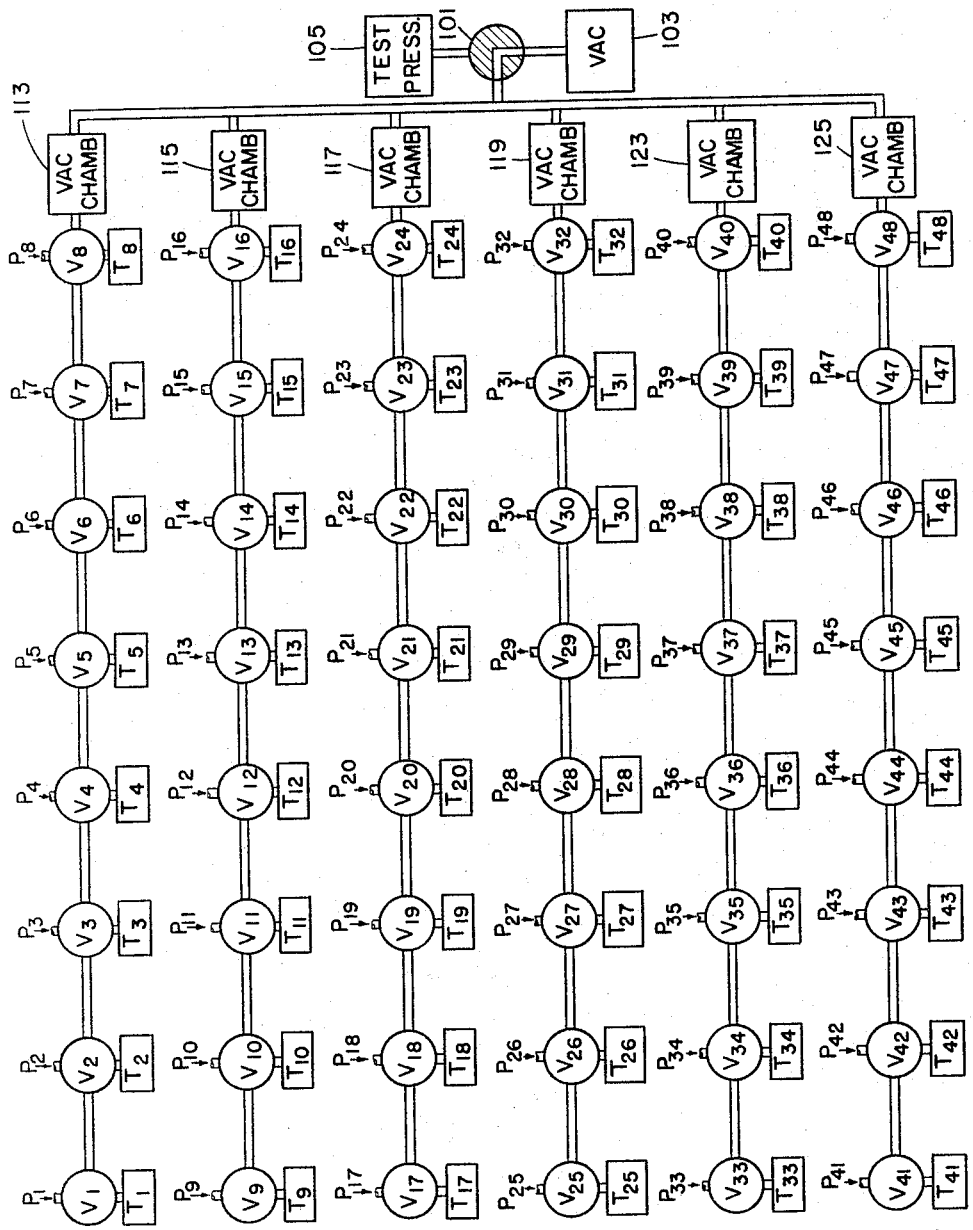
FIG. 6 illustrates a flow diagram in a forty-eight pressure transducer system.

Referring now to FIG. 6 of the drawings, a system for calibrating and reading tunnel pressures from forty-eight different locations within the tunnel is provided in which a two-way valve 101 connects six banks of eight transducers each to either a vacum, or to a test pressure. A source of vacuum is provided by unit 103 and a source of test pressure is provided by unit 105. A first bank of transducers T1 through T8 is connected to vacuum chamber 113 or to tunnel pressure P1 through P8, respectively, by the operation of valves V1 through V8, respectively. Similarly, valves V9 through V16 connect transducers T9 through T16, respectively, to pressures P9 through P16, respectively, and to vacuum chamber 115. In the same manner valves V17 through V24 connect transducers T17 through T24 to pressures P17 through P24, respectively, or to vacuum chamber 117, and again, in the same manner, valves V25 through V32 connect transducers T25 through T32 to pressures P25 through P32, respectively, and to vacuum chamber 119. Valves V33 through V40 connect transducers T33 through T40 to pressure P33 through P40, respectively, or to vacuum chamber 123. Similarly, valves V41 through V48 connect transducers V41 through V48 to pressures P41 through P48, respectively, or to vacuum chamber 125. In the operation, valves V1 through V48 may be mechanically connected or ganged together to operate simultaneously. Initially, valves V1 through V48 will be set to connect the transducers T1 through T48 to the calibrate position; that is, the transducers will be connected to their respective vacuum chambers and to the vacuum and test pressure units. When the valve 101 is in the position shown, a hard vacuum may be applied to the transducers through the respective vacuum chambers. The vacuum chambers will be evacuated by vacuum unit 103. A zero pressure or vacuum may now be taken and recorded from each of the transducers T1 through T48 to establish a first calibration pressure point for each of the transducers. Valve 101 may then be rotated to a position in which test pressure unit 105 is connected to vacuum chambers 113 through 125. Readings may again be taken and recorded from each of the transducers to establish second calibration pressure points for each of the transducers. A line drawn between the first and second calibration pressure points of each of the transducers will give the characteristics of each of the transducers. Valves V1 through V48 may now be simultaneously switched to the tunnel pressure read position and forty-eight independent separate pressures P1 through P48 may now be measured separately by transducers T1 through T48, respectively. Transducers will have electrical outputs, not shown, which may be connected to input circuits of a high speed data reduction unit, not shown.

Obviously many modifications and variations are possible in light of the above teachings. It is therefore to be understood that within the scope of the appended claims, the invention may be practiced otherwise than as specifically described.

What is claimed as new and desired to be secured by Letters Patent of the United States is:

1. A combination valve and pressure transducer assembly comprising a cylindrical body member,
   a first plurality of pressure transducers mounted radially on the cylindrical body,
   a second plurality of pressure transducers mounted radially on said cylindrical body,
   a rotatable shaft disposed coaxially within said cylindrical body,
   a first disc valve mounted at one end of the cylindrical body on said rotatable shaft and rotatable with said shaft,
   a second disc valve mounted on the other end of said cylindrical body and on said rotatable shaft and rotatable with said shaft,
   a first end plate covering said first disc valve and forming a first chamber between said first disc valve and said first end plate,
   a second end plate mounted at the other end of said cylindrical body and forming a second chamber between said second disc valve and said second end plate,
   a reference pressure source,
   passage means connecting said transducers to said reference pressure when said valves are in a first position,
   passage means connecting said transducers to a plurality of test pressure sources when said valves are in a second position,
   means rotating said valves to said first and second positions whereby said transducers may be calibrated simultaneously and test pressures may be measured from a plurality of stations simultaneously.

2. A system for calibrating a large number of pressure transducers simultaneously and for measuring a plurality of pressures within a wind tunnel simultaneously comprising, a plurality of pressure transducers, each of said transducers having an electrical output,
a source of vacuum,
a source of reference pressure,
a plurality of wind tunnel pressure measuring stations,
a vacuum chamber,
a first valve means for alternately connecting each of said pressure transducers to said vacuum chamber and to each of said plurality of respective pressure measuring stations,
second valve means for connecting said vacuum chamber to said source of vacuum and to said source of reference pressure selectively whereby said pressure transducers may be calibrated simultaneously and a large number of pressures may be measured simultaneously.

3. A system for measuring the large number of pressures in a wind tunnel comprising,
a plurality of banks of pressure measuring devices,
a plurality of vacuum chambers,
means connecting each of said plurality of banks of pressure measuring devices to a respective one of said vacuum chambers,
a vacuum source,
a reference pressure source,
a plurality of pressure measuring stations,
first valve means,
means connecting said vacuum source to said first valve means,
means connecting said pressure reference source to said first valve means,
means connecting each of said plurality of vacuum chambers to said first valve means whereby each of said vacuum chambers may be subjected to a vacuum or to a reference pressure selectively,
second valve means in each of said plurality of pressure transducer banks,
said second valve means operable to connect said pressure transducer banks to a respective vacuum chamber and to connect each of said pressure transducers in each of pressure transducer banks to a respective pressure station.

4. A pressure transducer calibrating and measuring system comprising,
a first plurality of pressure transducers mounted on a first cylinder body,
a second plurality of pressure transducers mounted on said first cylinder body,
a third plurality of transducers mounted on a second cylinder body,
a fourth plurality of pressure transducers mounted on said second cylinder body,
a fifth plurality of pressure transducers mounted on a third cylinder body,
a sixth plurality of pressure transducers mounted on said third cylinder body,
a first rotary disc valve mounted at one end of said first cylinder body and rotatable coaxially therewith,
a second rotary disc valve mounted at the other end of said first cylinder body and rotatable coaxially therewith,
a third rotary disc valve on one end of said second cylinder body and rotatable coaxially therewith,
a fourth rotary disc valve on the other end of said second cylinder body and rotatable coaxially therewith,
a fifth rotary valve mounted on one end of said third cylinder body and rotatable coaxially therewith,
a sixth rotary valve mounted at the other end of said third cylinder body and rotatable coaxially therewith,
said first valve having multiple ports to simultaneously connect each of said first plurality of transducers to a vacuum chamber and to respective pressure stations selectively,
said second valve body having multiple ports to simultaneously connect each of said second plurality of pressure transducers to a second vacuum chamber and to respective pressure stations selectively,
said third valve body having multiple ports to connect each of said third plurality of transducers to connect each of said transducers to a vacuum chamber simultaneously and to respective pressure stations selectively,
a fourth valve body having multiple ports to simultaneously connect said fourth plurality of pressure transducers to a fourth vacuum chamber to respective pressure stations selectively,
a fifth valve body having multiple ports to simultaneously connect each of said fifth plurality of pressure transducers to a fifth vacuum chamber and to respective pressure stations selectively,
a sixth rotary valve having multiple ports to simultaneously connect said sixth plurality of pressure transducers to a sixth vacuum chamber and to a plurality of respective pressure stations selectively,
a two-way valve,
a source of vacuum,
a source of reference pressure,
means connecting said two-way valve to said vacuum chambers,
means connecting one port of said two-way valve to said source of vacuum,
means connecting a second port of said two-way valve to said source of reference pressure whereby said pressure transducers may be calibrated,
means for simultaneously rotating said rotary valves whereby a large plurality of pressures may be measured simultaneously.

5. A combination rotary valve and pressure transducer assembly comprising,
a cylindrical valve body defining a chamber,
a plurality of pressure transducers mounted radially on said cylindrical valve body,
a rotary disc valve disposed rotatably within said valve body and plurality of first passages for connecting each of said pressure transducers to said chamber and a plurality of second passages for connecting each of said transducers to a respective pressure station,
a source of vacuum,
a source of reference pressure,
a second valve means, said second valve means selectively connecting said chamber to said source of vacuum and to said source of reference pressure,
means for rotating said rotary disc valve from a first position in which each of said transducers are connected to said chamber to a second position in which each of said transducers are connected to respective pressure stations whereby said transducers may be calibrated and plurality of pressures may be measured.

6. A combination rotary valve and pressure transducer assembly comprising,
a cylindrical body member,
a first plurality of pressure transducers mounted in radial alignment near a first end of said cylindrical body,
a second plurality of pressure transducers mounted in radial alignment near a second end of said cylndrical body,
a first rotary valve assembly at the first end of said cylindrical body including a first rotatable disc valve body and a first chamber, said first valve body rotatable from a first position to a second position, said first valve body having a first passageway for each pressure transducer of said first plurality of pressure transducers, said first valve body having a first port for each pressure transducer of said plurality of pressure transducers,
a second rotary valve assembly at the second end of said cylindrical body including a second rotatable disc valve body and a second chamber, said second valve body rotatable from a first position to a second position, said second valve body having a second passageway for each pressure transducer of said second plurality of pressure transducers, said second valve body having a second port for each pressure transducer of each pressure transducer of said second plurality of pressure transducers, shaft means coaxial with said cylindrical body and fixedly connected to said first and second valve bodies whereby said valve bodies may rotate together, means connected to said shaft means for rotating said first and second valve bodies to said first and said second positions, said cylindrical body having a first plurality of passages between each of said first plurality of transducers and said first valve body, said cylindrical body having a second plurality of passages between each of said second plurality of transducers and said second valve body, a third plurality of passages in said cylindrical body between said first valve body and a respective pressure station in a wind tunnel, a fourth plurality of passages in said cylindrical body between said second valve body and a respective pressure station in said wind tunnel, said first passages in said first valve body connecting said first plurality of passages in said cylindrical body respectively to said third plurality of passages in said cylindrical body when said valve body is in said first position, said second passages in said second valve body connecting said second plurality of passages in said cylindrical body respectively to said fourth plurality of passages in said cylindrical body when said valve body is in said first position, each first port of said first valve connecting each of said first plurality of passageways of said cylindrical body to said first chamber when said first valve body is in said second position, each second port of said second valve connecting each of said second plurality of passageways to said second chamber when said second valve body is in said second position.

7. A system for calibrating a large number of pressure transducers simultaneously comprising, a plurality of pressure transducers, each of said plurality of pressure transducers having electrical output circuit terminals, said terminals connectable to external indicating and recording means, chamber means, first valve means for selectively connecting said plurality of pressure transducers to said chamber means and to respective pressure stations, a source of vacuum, a source of reference pressure, second valve means for selectively connecting said source of vacuum and said source of reference pressure to said chamber means,

References Cited

UNITED STATES PATENTS

| | | | |
|---|---|---|---|
| 2,427,370 | 9/1947 | Schweitzer | 73—116 |
| 2,551,526 | 5/1951 | Campbell | 73—147 |
| 2,813,421 | 11/1957 | Cheney et al. | 73—147 |
| 2,814,198 | 11/1957 | Howland | 73—147 |
| 3,040,777 | 6/1962 | Carson et al. | 137—625.15 |
| 3,109,457 | 11/1963 | Oliveau | 137—625.18 |
| 3,114,393 | 12/1963 | Vlasic | 137—625.18 |

LOUIS R. PRINCE, *Primary Examiner.*